United States Patent [19]

Yano

[11] Patent Number: 4,564,898
[45] Date of Patent: Jan. 14, 1986

[54] PROGRAMMABLE CONTROLLER HAVING A DRUM TYPE SEQUENCER FUNCTION SUBJECT TO PROGRAMMING

[75] Inventor: Satoshi Yano, Hirakata, Japan

[73] Assignee: Omron Tateisi Electronics Co., Kyoto, Japan

[21] Appl. No.: 507,003

[22] Filed: Jun. 23, 1983

[30] Foreign Application Priority Data

Jun. 25, 1982 [JP] Japan ................... 57-109443
Oct. 22, 1982 [JP] Japan ................... 57-185471

[51] Int. Cl.$^4$ ................... G06F 15/46; G05B 11/01
[52] U.S. Cl. ................... 364/140; 364/153; 364/183
[58] Field of Search ................... 364/140–142, 364/146–148, 152–153, 183, 188–189; 318/590–596, 600–601, 603, 567–569

[56] References Cited

U.S. PATENT DOCUMENTS

| | | | |
|---|---|---|---|
| 4,059,745 | 11/1977 | Gaertner | 364/153 X |
| 4,143,415 | 3/1979 | Klingbeil | 364/153 X |
| 4,228,509 | 10/1980 | Kennedy | 364/153 X |
| 4,250,543 | 2/1981 | Smith et al. | 364/153 X |
| 4,272,818 | 6/1981 | McDaniel | 364/183 X |
| 4,356,554 | 10/1982 | Susnjara et al. | 364/183 X |
| 4,387,421 | 6/1983 | Zach et al. | 364/148 |
| 4,404,625 | 9/1983 | Saito et al. | 364/146 X |
| 4,439,825 | 3/1984 | Donner | 364/183 X |

Primary Examiner—Gary V. Harkcom
Attorney, Agent, or Firm—Cushman, Darby & Cushman

[57] ABSTRACT

A programmable controller has an exclusive-use command termed as a drum counter command in order to perform the same control as that of a drum type sequencer. An inching condition of the drum counter command corresponds to an inching condition of the drum of the drum type sequencer. Data in the numeric range compared with a counter count value of the drum counter command corresponds to a cam provided in the periphery of the drum in the drum type sequencer. The logic of the output is determined as the result of comparison between the counter count value and the set data in the numeric range.

3 Claims, 6 Drawing Figures

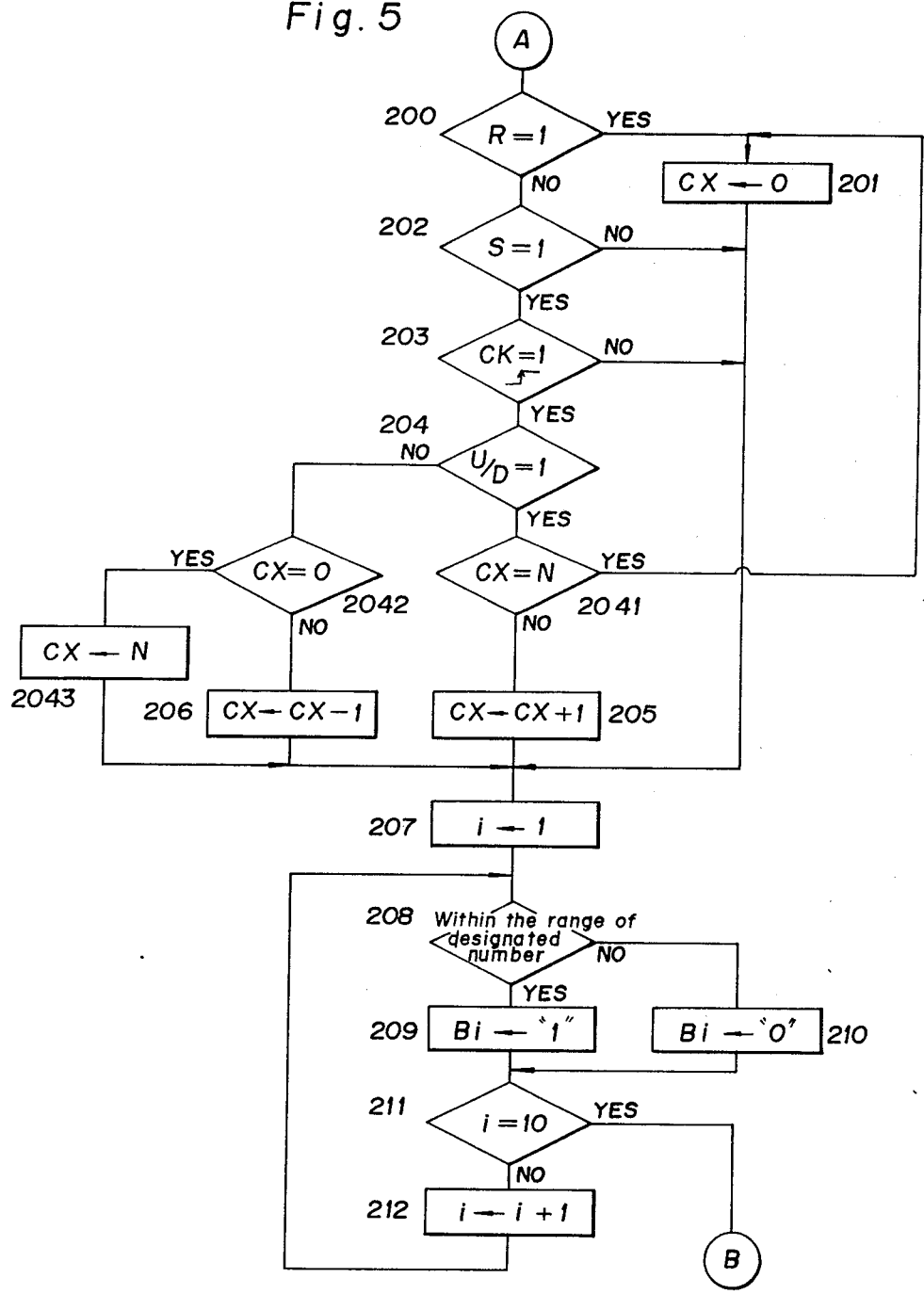

PROGRAMMABLE CONTROLLER HAVING A DRUM TYPE SEQUENCER FUNCTION SUBJECT TO PROGRAMMING

BACKGROUND OF THE INVENTION

This invention relates to a programmable controller of a scanning type represented by a relay ladder diagram programming type.

Before programmable controllers were developed, the use of mechanical and simple sequence controllers, known respectively as a drum type sequencer and a rotary cam type sequencer, had been widely used.

The rotary cam type sequencer is designed so that a few cams are placed one over another on a rotary shaft and microswitches are arranged in positions corresponding to each cam. The microswitches are turned on and off in order by the rotation of the shaft. The drum type sequencer is also operated on the same principle as the rotary cam sequencer. In the drum type sequencer, the rotary drum is formed at its periphery with a groove into which is embedded a metal projection corresponding to the cam.

The sequence controllers of this kind are characterized in that their construction is simple and the sequence can be changed readily. However, there are parts which are mechanically worn and in addition, precise setting is difficult to make. Moreover, these controllers can only be applied to sequence control which is extremely small in scale and simple. At present, the aforesaid sequence controllers are rarely used.

On the other hand, most programmable controllers serve large-scale, complicated and high-degree control functions. Generally speaking, the large-scale control effected by programmable controllers includes a series of partly small-scale and simple sequence controls. It is very convenient that such a small-scale and simple sequence control be taken as a single control unit and programming is provided by way of expression similar to the above-described drum type sequencer.

A few programming types of programmable controllers are known. The most general type is the relay ladder diagram type. This is the type in which the sequence control system is expressed in the form of a circuit diagram using a relay to provide programming. Prepared sequence circuit diagrams are programmed directly or indirectly in preselected languages.

Even the conventional programmable controller of this kind can effect the same control as that of the drum type sequencer. However, programming for that purpose is not simple. Generally, a shift register command or stepping switch command is used or counter command and data comprison command are combined to program the same sequence control as that handled by the drum type sequencer.

To realize the control function of the drum type sequencer, there is originally required an inching signal for controlling the rotation of the drum and position information of the cam provided on the periphery of the drum.

Notwithstanding, if the function of the drum type sequencer is intended to be realized by the conventional programmable controller, an extremely lengthy program has to be set up by using commands as mentioned above. Therefore, programming is cumbersome and tends to make errors.

That is, despite the fact that the final control function comprises a simple sequence control, there is no exclusive-use command and therefore, the lengthy program, including a complicated intermediate logic process has to be set up.

Also, since the program includes such an intermediate logic process as described, the content of the program is very difficult to read. Accordingly, even in the case where the content of sequence control is partly changed, correction of the program for that purpose is not simple and errors are liable to occur.

As described above, the charateristic of the drum type sequencer, wherein the sequence change may be accomplished readily has not been introduced into conventional programmable controllers.

BRIEF SUMMARY OF THE INVENTION

It is an object of the present invention to provide a programmable controller in which a function of a drum type sequencer can be made subject to programming, in the form directly connected to the essence of the content to be controlled in an extremely simple manner omitting an unnecessary intermediate logic process.

In order to achieve the aforesaid object, this invention is characterized by comprising counter means freely controllable by a user program; a status memory which can be freely read in bit unit by the user program; a set value table in which data showing the numeric range is stored in an area corresponding to each bit of said status memory; input means for writing data in a free numeric range into said set value table; comparison means which when a command related to said counter means in the user program is executed, successively compares counted values of said counter means with data in each numeric range of said set value table to judge whether or not said counted value is within the set numeric range; and status update means which determines the logic of each bit of said status memory corresponding to data in each numeric range in accordance with the result of judgement of said comparison means.

In accordance with the present programmable controller, control conditions of said counter means (hereinafter referred to as "drum counter") are set in the user program, and data in the free numeric range is written in said set value table whereby each bit of said status memory is changed to "1" or "0" in accordance with the counting operation of the drum counter, and said each bit may be freely used in the user program.

That is, the inching condition of the drum type sequencer corresponds to the inching condition of the drum counter, and the position of the cam provided in the periphery of the drum corresponds to said data in the numeric range. In this manner, programming can be accomplished by the almost same simple logic as that of the drum type sequencer. Thus, no cumbersome programming of the intermediate logic process as encountered in the prior art is required.

Furthermore, the data in the numeric range stored in the set value table is disconnected from a series of steps of the user program. Therefore, in partly changing the user program, the data in the numeric range is not erroneously rewritten, or conversely the user program is not erroneously destroyed when the data in the numeric range is changed. Even in this respect, the programming becomes very easy.

Other and further objects of this invention will becomes obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIGS. 4 and 5 are respectively flow charts showing a schematic structure of the software of said programmable controller.

DETAILED DESCRIPTION OF THE INVENTION

Figure 1:
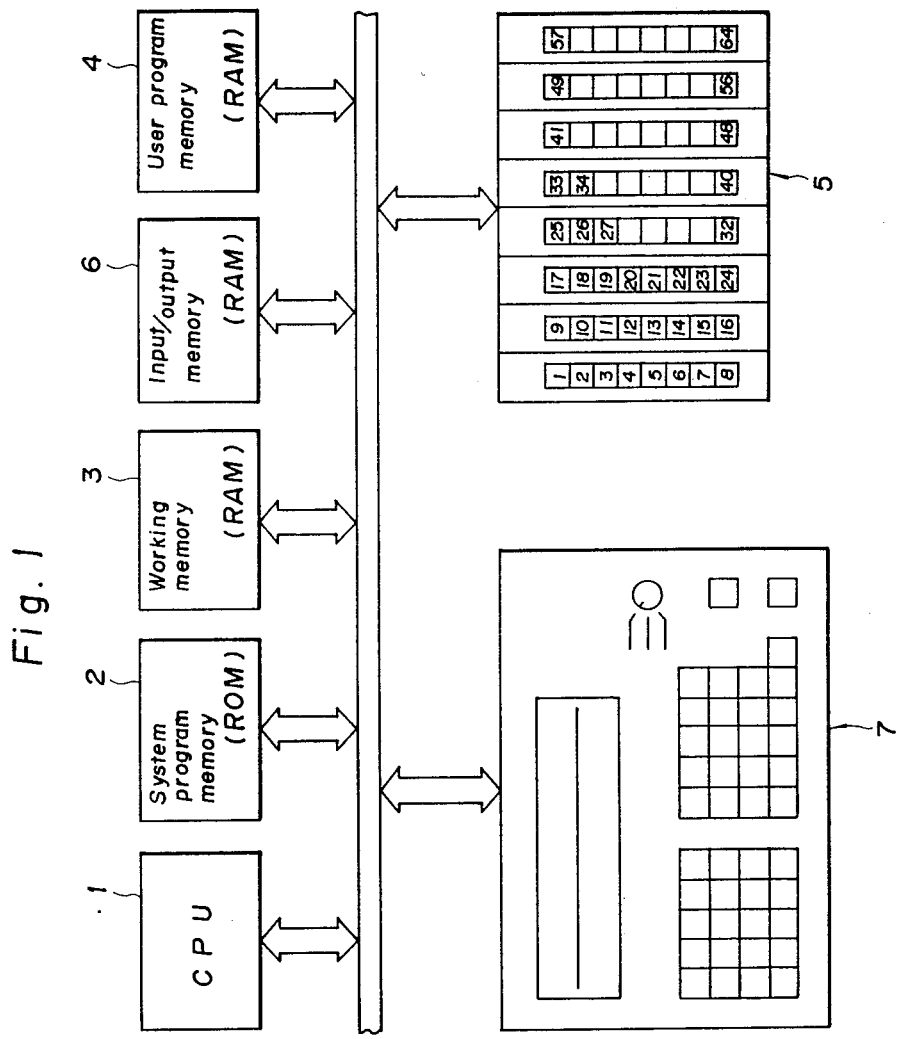
FIG. 1 is a block diagram showing a schematic structure of the hardware of a programmable controller in accordance with one embodiment of the present invention.

FIG. 1 is a block diagram showing a schematic structure of the programmable controller system to which the present invention is applied. The programmable controller system comprises a CPU 1 (Central Processing Unit) which is the hub of the control system, a system program memory 2 in which system programs executed by the CPU 1 are stored, a working memory 3 used as a temporary storing area of various variable data by the CPU 1, a user program memory 4 in which sequence control programs freely set by the user are stored, an input/output unit 5 including an input interface to which external input signals are fed and an output interface which delivers external output signals, an input/output memory 6 storing other circuit data, a so-called internal relay or an auxiliary relay in addition to an area serving as a buffer memory for input/output data corresponding to the input/output unit 5, and a program console 7 which provides various operating instructions for the CPU 1, provides inputs for preparing the user program or inputs for monitor instructions or provides a display at the time of said input and a monitor display.

It will be noted that in a relatively small scaled programmable controller, said CPU 1, system program memory 2, working memory 3 and input/output memory 6 are constructed by a so-called one-chip microcomputer.

As is known, the execution operation of the user program in the programmable controller of this kind includes successively reading user commands from the user program memory 4, operating and processing the input/output data stored in the input/output memory 6 in accordance with the user commands, and updating the designated input/output data in accordance with the result of said operating and processing. In synchronism with the execution of the user program, the programmable controller performs the operation (input update) for writing the input data fed to the input/output unit 5 into a predetermined area of the input/output memory 6, and the operation (output update) for transferring the output data in the predetermined area of the input/output memory 6 to the input/output unit 5.

The sequence status designated by the user program is produced by the aforesaid operations in the relation between the external input signal fed to the input/output unit 5 and the external output signal put out from the input/output unit 5.

It is known that the objects subjected to operation and processing in the user program are not only the input/output data of the input/output unit 5 but the data stored in the input/output memory 6 or working memory 3 which is the so-called internal relaty or auxiliary relay. It is also known that the memory 3 or memory 6 is used to effect processing which handles the numeric data for so-called timer commands, counter commands, etc. Sometimes, processing of shift register command and stepping switch commands can be carried out.

Next, the command termed as the drum counter command which constitutes the essential portion of the present invention for realizing the same control function as that of the drum type sequencer and processing therefore will be described.

Figure 2A:
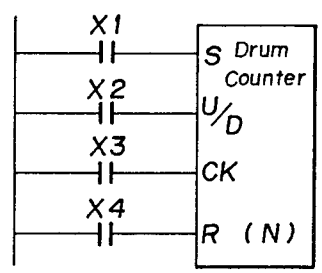
FIG. 2A illustrates drum counter commands.
Figure 2B:
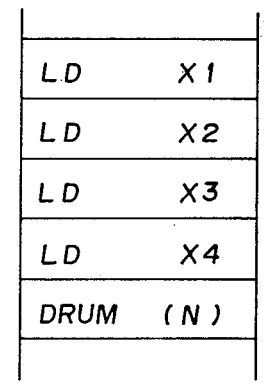
FIG. 2B illustrates a table in which drum counter commands are written in mnemonic code.

FIG. 2(A) shows the expression of symbols of the drum counter command on the relay ladder circuit diagram. FIG. 2(B) is a table in which the drum counter commands are written in the form of mnemonic code word by word.

In the drum counter command in this embodiment, four kinds of input signals S, U/D, CK, and R are necessary. S designates a start signal for actuating the drum counter. U/D designates a signal to instruct whether the drum counter is actuated up or actuated down. CK designates an inching signal of the drum counter. R designates a reset signal of the drum counter.

Where the drum counter commands are set as shown in FIG. 2(B), said input condition signals S, U/D, CK and R are set up in said order as the load command (LD), and thereafter, the command code "DRUM" representative of the drum counter command and the count upper limit value N of the drum counter command corresponding to the aforesaid command code are set. By setting these, the N-coded up/down counter is realized as will be described later.

Figure 3:
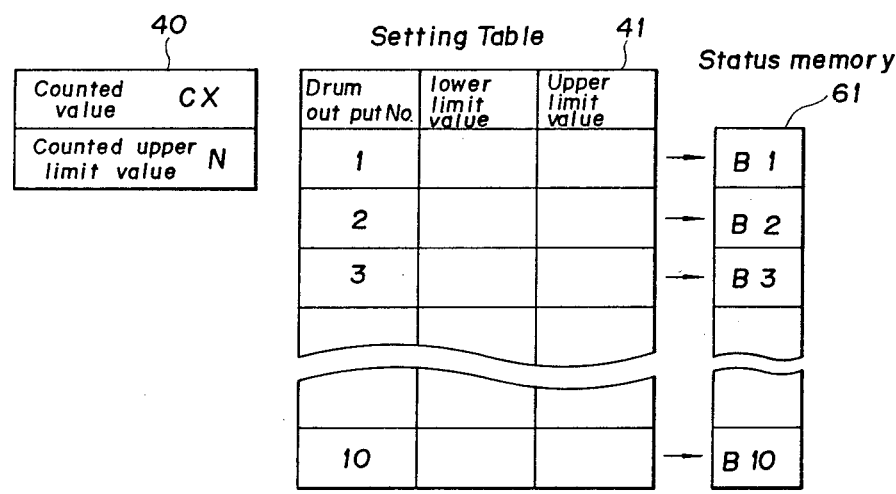
FIG. 3 illustrates a set table 41 and a status memory 61.

In the programmable controller in accordance with the present invention, a counter area 40 for storing the counter value CX and count upper limit value N of the drum counter command is assigned within the user program 4, as shown in FIG. 3, to execute the aforesaid drum counter command. Also, a set table 41 which will be described later is assigned within the user sub-program 4. And, a status memory 61 is assigned within the input/output memory 6.

The drum counter command in the present embodiment is provided with 10 drum outputs from "1" to "10". An upper limit area and a lower limit area are assigned to said set table 41 to set the data in a free numeric range, corresponding to the drum output numbers. Free numeric values can be written into the upper limit value area and lower limit value area of the set table 41 by operating the program console 7.

Data areas B1–B10 of one bit are assigned to the status memory 61 corresponding to the drum output numbers.

When the drum counter command is executed, the CPU 1 performs the following processings.

First, the count value CX of the drum counter is controlled in accordance with the aforesaid four input signals and the count upper limit value N. Next, comparison and operation are made whether or not the count value CX is within or outside the range of the data in the numeric range set according to the drum output numbers.

Where the count value CX of the counter is within the range of the set numeric data, one bit in the status memory 61 of the corresponding output number is set to "1". Where the count value CX is outside the set numeric data, the corresponding bit in the status memory 61 is set to "0".

Bits B1–B10 of the status memory 61 can be freely read in the user program. For example, the bits B1–B10 can be used as output signals without modification. Also, these signals can be used for some kind of logic operation. How the data of the status memory 61 is utilized for control is freely determined by the user program.

Figure 4:
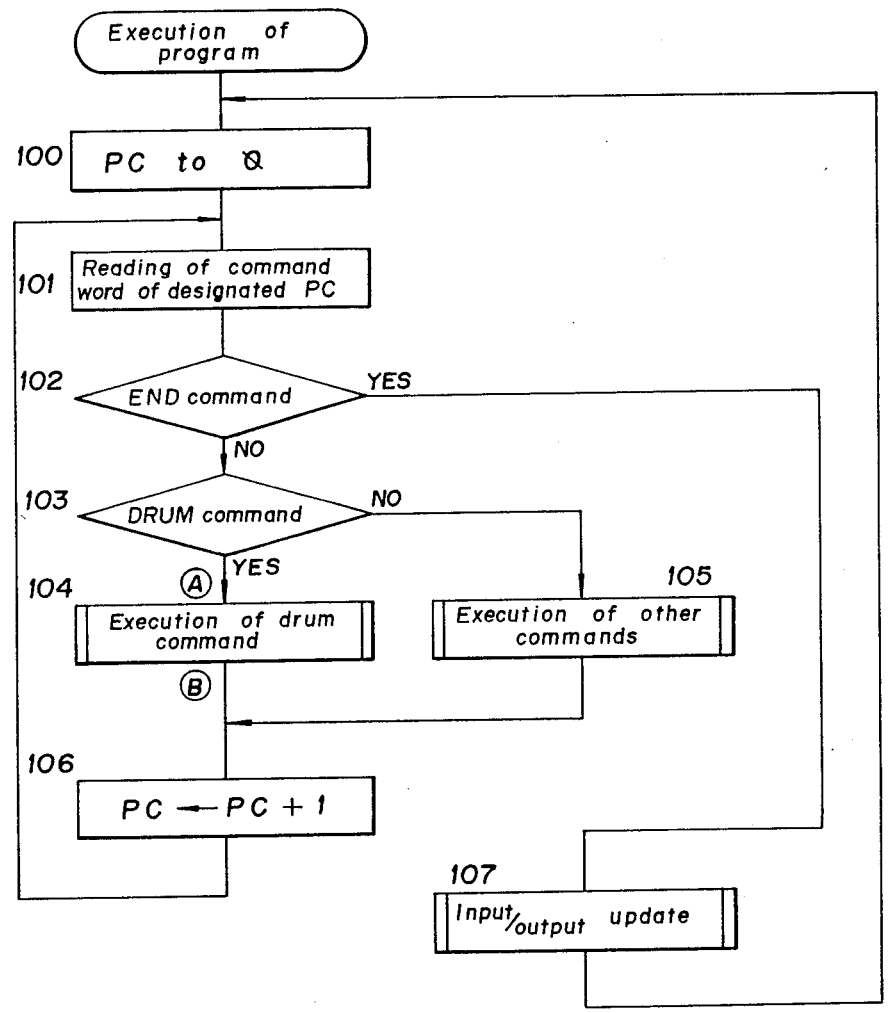

The above-described processing contents are shown in the flow charts of FIGS. 4 and 5. FIG. 4 is a schematic flow chart of an execution routine of the user program. First, a program counter PC for addressing the user program memory 4 is cleared to read the command of the user program memory 4 indicated by the program counter PC (Steps 100, 101).

Next, it is checked whether or not the read command is the END command inserted at the end of the user program (Step 102). Then, it is checked whether or not the read command is the drum counter command (Step 103), and if it is the drum counter command, this command is executed in Step 104 and if it is another command, this command is executed in Step 105.

After execution of the command, the program counter PC is incremented in Step 106, and the step is returned to Step 101 for execution of the subsequent command. When the final END command of the user program is read, the step proceeds from Step 102 to 107 to effect the above-described input/output updating operation and then returns to Step 100.

FIG. 5 is a flow chart showing the details of the execution routine of the drum counter command of the Step 104. This is executed when the "DRUM" command is read from the user program memory 4.

The status of the signals S, U/D, CK and R are read into the stack by four commands immediately before the "DRUM" command. In Steps 200–206, the drum counter is controlled in accordance with these signals S, U/D, CK and R.

That is, if the reset signal R is supplied, the counter is reset. If the start signal S and clock signal CK are supplied, the counter is incremented or decremented in accordance with the signal state of U/D, but the following processings are carried out before then.

When in the up mode, it is checked whether or not the count value CX reaches the count upper limit value N in Step 2041. In the case of CX=N, the count value CX is cleared to 0 in Step 201. If the value CX does not reach N, then the count value CX is incremented by 1 in Step 205.

When in the down mode, it is checked whether or not the count value CX is 0 in Step 2042. In the case of CX=0, the count upper limit value N is preset to the count value CX in Step 2043. If the count value CX is not 0, the count value CX is decremented by 1 in Step 206.

Next, 1 is set in a register i for designating the drum output number to be first assigned to the first output number "1" (Step 207). Next, the data in the numeric range corresponding to the assigned number of the register i is read from the set table 41, and said data is compared with the count value data of the counter to judge whether or not it is within the set range (Step 208). If it is within the range, bit Bi of the status memory 61 is set to "1" in Step 209, and when it is outside the range, bit Bi of the status memory 61 is set to "0" in Step 210.

Next, it is judged whether or not the register i is the final output number "10" in Step 211, and if it is not "10", the content of the register i is incremented by 1 in Step 212 and the flow chart returns to Step 208. The above-described processings are carried out up to the output number "10" to complete the processing in respect of the drum counter command.

In this manner, the counter value CX of the drum counter is controlled in accordance with the contents of the user program. Also, as the count value CX of the drum counter changes, the bits B1–B10 of the status memory are controlled so as to be turned on and off in accordance with the set contents of the data in the numeric range of the set table 41.

Incidentally, the count upper limit value N of the drum counter corresponds to the number of steps per rotation of the drum in the drum type sequencer. In the above-described embodiment, said counter upper limit value N is freely set by the user program. Therefore, it is possible to obtain a program of extremely high freedom depending on the control object. However, the present invention is not limited to the above-described embodiments. Even if the count upper limit value N is locked to a suitable predetermined value, the object of the present invention may be achieved sufficiently.

What is claimed is:

1. A programmable controller, including a memory for storing a user program, comprising:
   counter means freely controlled by said user program;
   a status memory which can be be freely read in a unit of at least one bit in accordance with said user program;
   a set value table in which data showing numeric range is stored in an area corresponding to each bit of said status memory;
   input means for writing data in said numeric range into said set value table;
   comparison means which when a command related to said counter means in the user program is executed, successively compares a counted value of said counter means with data of each numeric range in said set value table to judge whether or not said counted value is within the stored numeric range; and
   status update means for determining the logic of each bit of said status memory corresponding to data in each numeric range in accordance with the result of the judgement of said comparison means.

2. A programmable controller of claim 1 wherein said counter means comprises an N-code up/down counter, and value N is locked to a suitable predetermined value where N is a positive integer.

3. A programmable controller of claim 1 wherein said counter means comprises an N-code up/down counter, and value N can be freely set by the user program where N is a positive integer.

* * * * *